(12) United States Patent
Chae et al.

(10) Patent No.: US 12,709,328 B2
(45) Date of Patent: Aug. 18, 2026

(54) STEERING CONTROL APPARATUS OF STEER-BY-WIRE SYSTEM AND STEER WHEEL FEEDBACK ACTUATOR COMPLIANCE MONITORING METHOD THEREOF

(71) Applicant: HL MANDO CORPORATION, Gyeonggi-do (KR)

(72) Inventors: Hansang Chae, Gyeonggi-do (KR); Sunggun Lee, Gyeonggi-do (KR); Jaewoo Lee, Gyeonggi-do (KR)

(73) Assignee: HL MANDO CORPORATION, Gyeonggi-do (KR)

( * ) Notice: Subject to any disclaimer, the term of this patent is extended or adjusted under 35 U.S.C. 154(b) by 23 days.

(21) Appl. No.: 18/827,481

(22) Filed: Sep. 6, 2024

(65) Prior Publication Data

US 2025/0242860 A1 Jul. 31, 2025

(30) Foreign Application Priority Data

Jan. 31, 2024 (KR) ........................ 10-2024-0015201

(51) Int. Cl.
*B62D 6/00* (2006.01)
*B62D 5/04* (2006.01)

(52) U.S. Cl.
CPC ........... *B62D 6/008* (2013.01); *B62D 5/0466* (2013.01)

(58) Field of Classification Search
CPC ...... B62D 6/008; B62D 5/0466; B62D 5/001; B62D 5/0481; B62D 5/006
See application file for complete search history.

(56) References Cited

U.S. PATENT DOCUMENTS

2024/0308579 A1* 9/2024 Aritomi ............ B60W 60/0061

FOREIGN PATENT DOCUMENTS

JP 2023-9387 1/2023

OTHER PUBLICATIONS

Office Action dated Jan. 22, 2026 for Korean Patent Application No. 10-2024-0015201 and its English translation provided by Applicant's foreign counsel.

* cited by examiner

*Primary Examiner* — Long T Tran
*Assistant Examiner* — Charles J Brauch
(74) *Attorney, Agent, or Firm* — WOMBLE BOND DICKINSON (US) LLP

(57) ABSTRACT

A steering control apparatus of a steer-by-wire system including a steer wheel feedback actuator and a road wheel actuator includes a controller configured to receive a first angle value from a first sensor provided at a lower steering shaft, connected to a steering wheel through an upper steering shaft and receive a second angle value from a second sensor provided at a motor of the steer wheel feedback actuator, and monitor compliance of the steer wheel feedback actuator using the first angle value and the second angle value based on determination of whether at least one of torque, a driving speed, and a steering angle of the steering wheel satisfies at least one preset condition for checking the compliance of the steer wheel feedback actuator.

20 Claims, 7 Drawing Sheets

STEERING CONTROL APPARATUS OF STEER-BY-WIRE SYSTEM AND STEER WHEEL FEEDBACK ACTUATOR COMPLIANCE MONITORING METHOD THEREOF

CROSS-REFERENCE TO RELATED APPLICATION

This application claims priority under 35 U.S.C. § 119 to Korean Patent Application No. 10-2024-0015201, filed on Jan. 31, 2024, in the Korean Intellectual Property Office (KIPO), the disclosure of which is incorporated by reference herein in its entirety.

TECHNICAL FIELD

The present disclosure relates to a steering control apparatus for a vehicle to which a steer-by-wire (SbW) system is applied and a method of monitoring compliance of a steer wheel feedback actuator (SFA) mechanical part included in the SbW system by the steering control apparatus.

BACKGROUND

Unlike general-purpose steering apparatuses, such as electric power steering (EPS) systems, an SbW system includes an SPA and a road wheel actuator (RWA). The SFA is provided on a steering wheel side and is configured to provide reaction force to a driver. The RWA is provided on a road wheel side and is configured to adjust a driving direction of a vehicle according to a driver's steering.

In the SbW system, the SEA and the RWA are not mechanically connected to each other but are connected by wires. Therefore, if compliance of the SFA mechanical part (SFA compliance) increases, the steering feel may deteriorate and a feeling of a gap occurs. In addition, if SFA compliance increases, noise may occur and the vehicle's response to steering may become slower. Therefore, a method of constantly monitoring SFA compliance in vehicles to which the SbW system is applied is required.

SUMMARY

In view of the above, the present disclosure provides a steering control apparatus capable of constantly monitoring compliance of a steer wheel feedback actuator (SFA) mechanical part in a vehicle to which the SbW system is applied and a method of monitoring SFA compliance thereof.

Technical objects to be achieved by the present disclosure are not limited to those described above, and other technical objects not mentioned above may also be clearly understood from the descriptions given below by those skilled in the art to which the present disclosure pertains.

The present disclosure provides a steering control apparatus of a steer-by-wire system comprising a steer wheel feedback actuator and a road wheel actuator including a controller configured to receive a first angle value from a first sensor provided at a lower steering shaft, connected to a steering wheel through an upper steering shaft and receive a second angle value from a second sensor provided at a motor of the steer wheel feedback actuator, and monitor compliance of the steer wheel feedback actuator using the first angle value and the second angle value based on determination of whether at least one of torque, a driving speed, and a steering angle of the steering wheel satisfies at least one preset condition for checking the compliance of the steer wheel feedback actuator.

The controller may be configured to calculate the torque of the steering wheel based on a difference between a third angle value received from a third sensor provided at the upper steering shaft connected to the steering wheel and the first angle value received from the first sensor provided at the lower steering shaft, and determine whether the torque of the steering wheel increases within a reference range.

The controller may be configured to determine that the torque of the steering wheel satisfies the at least one preset condition for checking the compliance of the steer wheel feedback actuator based on determination that the torque of the steering wheel increases within the reference range.

The controller may be configured to determine whether the driving speed of the steering wheel is lower than a threshold speed and determine that the driving speed of the steering wheel satisfies the at least one preset condition for checking the compliance of the steer wheel feedback actuator based on determination.

The controller may be configured to determine whether the steering angle of the steering wheel is within a threshold range and determine that the steering angle of the steering wheel satisfies the at least one preset condition for checking the compliance of the steer wheel feedback actuator based on determination that the steering angle of the steering wheel is within the threshold range.

The threshold range may be set based on the steering angle of the steering wheel when the torque of the steering wheel is 0.

The controller may be configured to update a first compliance based on a difference between the first angle value and the second angle value when the torque of the steering wheel is a positive number and the at least one preset condition for checking the compliance of the steer wheel feedback actuator is satisfied, and update a second compliance based on the difference between the first angle value and the second angle value when the torque of the steering wheel is a negative number and the at least one preset condition for checking the compliance of the steer wheel feedback actuator is satisfied.

The controller may be configured to generate a signal representing that a failure of the compliance of the steer wheel feedback actuator is detected when a sum of the first compliance and the second compliance is greater than a threshold value.

The present disclosure also provides a method of a steer-by-wire system including a steer wheel feedback actuator and a road wheel actuator, comprising receiving a first angle value from a first sensor provided at a lower steering shaft, connected to a steering wheel through an upper steering shaft, and receiving a second angle value from a second sensor provided at a motor of the steer wheel feedback actuator, determining whether a preset condition for checking compliance of the steer wheel feedback actuator is satisfied based on at least one of torque, a driving speed, and a steering angle of the steering wheel, and monitoring the compliance of the steer wheel feedback actuator using the first angle value and the second angle value based on determination that the preset condition for checking the compliance of the steer wheel feedback actuator is satisfied.

The present disclosure also provides a computer-readable recording medium configured to store at least one instruction, that when executed by a processor, causes the processer to perform to perform operations comprising determining whether a preset condition for checking compliance of a steer wheel feedback actuator of a steer-by-wire system is satisfied based on at least one of torque, a driving speed, and a steering angle of a steering wheel provided in the steer-by-wire system, and monitoring the compliance of the steer wheel feedback actuator using a first angle value received from a first sensor provided at a lower steering shaft, connected to the steering wheel through an upper steering shaft, and a second angle value received from a second sensor provided at a motor of the steer wheel feedback actuator based on determination that the preset condition for checking the compliance of the steer wheel feedback actuator is satisfied.

According to an embodiment of the present disclosure, since the steering control apparatus of a vehicle to which the SbW system is applied may constantly monitor compliance of the SFA mechanical part, the performance of the SFA mechanical part may be maintained and if a defect occurs, the defect may be detected at an early stage.

DETAILED DESCRIPTION

Figure 1:
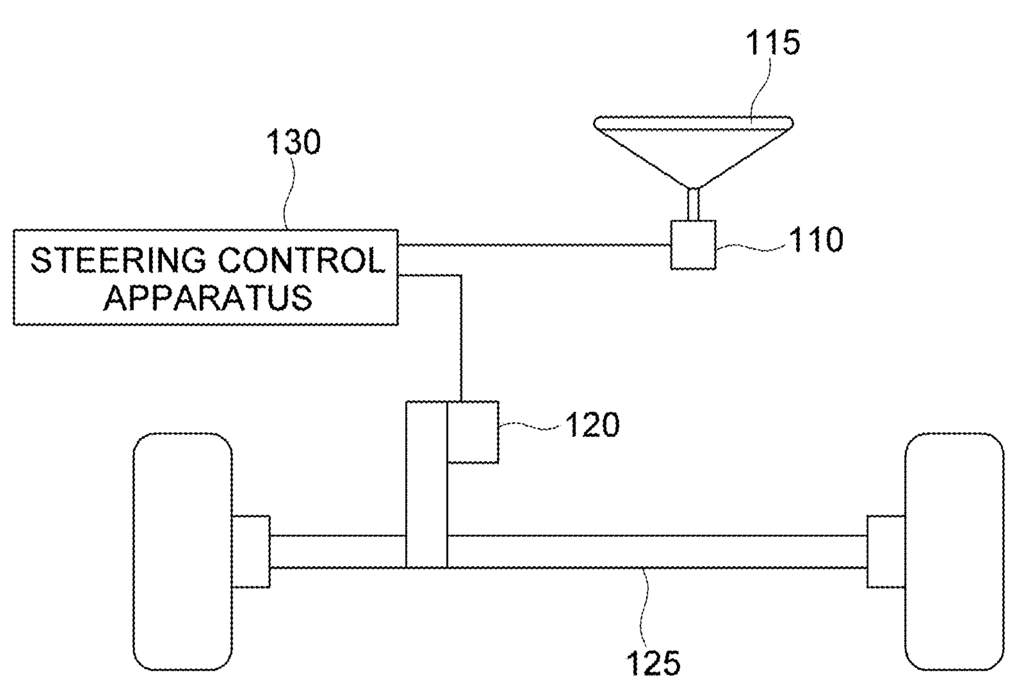
FIG. 1 is a diagram illustrating a steer-by-wire (SbW) system according to an embodiment of the present disclosure.

The advantages and features of the present disclosure, and a method for achieving them will be clearly understood with reference to the embodiments described in detail together with appended drawings. However, the present disclosure is not limited to the embodiments disclosed below but may be implemented in various other forms; rather, the present embodiments are provided to make the present disclosure complete and inform those skilled in the art clearly of the technical scope of the present disclosure, and the present disclosure may be defined within the technical scope of the appended claims. Thus, in some embodiments, well-known processing steps, structures, and techniques have not been described in detail to avoid obscuring the interpretation of the present disclosure.

The terms used in the present disclosure have been selected from commonly used and widely accepted terms that best describe the functions of the present disclosure; however, it should be noted that the selection of terms may vary depending on the intention of those persons skilled in the corresponding field, precedents, or emergence of new technologies. Also, in a particular case, some terms may be selected arbitrarily by the applicant, and in this case, detailed definitions of the terms will be provided in the corresponding description of the present disclosure. Therefore, the terms used in the present disclosure should be defined not simply by their apparent name but based on their meaning and context throughout the present disclosure.

Throughout the document, unless otherwise explicitly stated, if a particular element is said to "include" some particular element, it means that the former may further include other particular elements rather than exclude them.

In this specification, components of a steering control apparatus may refer to software or hardware components such as a field programmable gate array (FPGA) or an application specific integrated circuit (ASIC), and perform at least one function or operation. However, the above components are not limited to software or hardware. The components may be configured to be in an addressable storage medium and to run one or more processors. Therefore, as an example, the components may include components such as software components, object-oriented software components, class components and task components, processes, functions, properties, procedures, subroutines, segments of program code, drivers, firmware, microcode, circuits, data, databases, data structures, tables, arrays, and variables. The functions provided by the components of the present disclosure may be combined into a smaller number of components or may be further separated into additional components.

Also, the terms such as first, second, and third are introduced to describe various constituting elements, but the constituting elements should not be limited by the terms. The terms are used only for the purpose of distinguishing one from the other constituting elements.

In what follows, embodiments of the present disclosure will be described in detail with reference to appended drawings so that those skilled in the art to which the present disclosure belongs may readily apply the present disclosure. Moreover, to describe the present disclosure without ambiguity, those parts not related to the description of the present disclosure have been omitted. Throughout the document, the same reference symbols refer to the same constituting elements.

FIG. 1 is a diagram illustrating a Steer by Wire (SbW) system according to an exemplary embodiment of the present disclosure.

Referring to FIG. 1, the SbW system may include a Steer wheel Feedback Actuator (SFA) 110, a Road Wheel Actuator (RWA) 120, and a steering control apparatus 130.

The SFA 110 may be configured to generate reaction force in a direction opposite to the rotation of the steering wheel 115. To this end, in one example, a mechanical part including the SFA 110 (hereinafter referred to as the SFA mechanical part) may be equipped with an electric motor. The electric motor may be referred to as a reaction force motor. A torque generated by the electric motor may be provided or applied to the steering wheel 115 via a torsion bar provided on a steering shaft. One side of the steering shaft may be equipped with a sensor for measuring a torque applied to the torsion bar. One side of the electric motor may be equipped with a sensor for measuring a rotation angle of the electric motor. The measurement values obtained by each of the sensors may be transmitted to the steering control apparatus 130 via a Controller Area Network (CAN) bus.

The RWA 120 may not be mechanically connected to the SFA 110, but may be connected by wire. The RWA 120 may be configured to move the rack 125 to a position corresponding to a steering angle of the steering wheel 115. To this end, a mechanical part including the RWA 120 (hereinafter referred to as a RWA mechanical part) may be provided with a pinion and a drive motor. One side of the pinion may be equipped with a sensor for measuring the position of the rack 125. One side of the drive motor may be equipped with a sensor for measuring the rotation angle, position, torque, and the like of the drive motor. The measurement values obtained by each of the sensors may be transmitted to the steering control apparatus 130.

The steering control apparatus 130 may control the steering of the vehicle to which the SbW system is applied by using the SFA 110 and the RWA 120. In one example, the steering control apparatus 130 may control the driving of the SFA 110 and/or the RWA 120 by using information about the steering angle of the steering wheel 115, the torque applied to the torsion bar, the rack position, and the like. In addition, the steering control apparatus 130 may derive information on a torque, a drive speed, a steering angle, and the like of the steering wheel 115 based on the measurement values received from the sensors provided on the mechanical part of the RWA 120, and may monitor compliance of the RWA mechanical part based on the derived information.

In the meantime, the steering control apparatus 300 may be implemented as at least one Electronic Control Unit (ECU). While FIG. 1 illustrates one example where a single steering control apparatus 130 controls the SFA 110 and RWA 120, the SbW system may include two or more ECUs as needed. In this case, the SFA 110 and the RWA 120 may each be controlled by different ECUs.

Figure 2:
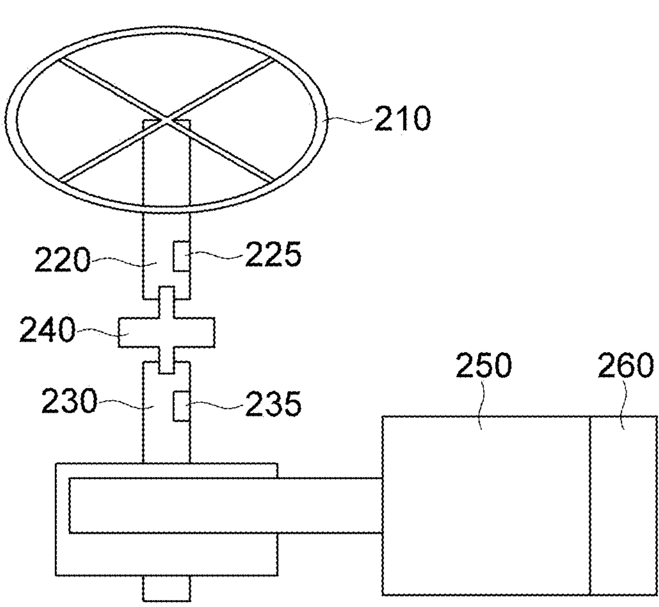
FIG. 2 is a diagram illustrating a steer wheel feedback actuator (SFA) mechanical part of an SbW system according to an embodiment of the present disclosure.

FIG. 2 is a diagram illustrating an SFA mechanical part of an SbW system according to an embodiment of the present disclosure.

Referring to FIG. 2, a steering wheel 210 may be provided on an upper side of the SFA mechanical part. The steering wheel 210 may be connected to an upper steering shaft 220. The upper steering shaft 220 and a lower steering shaft 230 may be connected by a torsion bar 240. One side of the lower steering shaft 230 may be connected to a reaction motor 250, and a reaction force due to driving or rotation of the reaction motor 250 may be transmitted to the torsion bar 240 through the lower steering shaft 230. A position sensor 260 may be provided on one side of the reaction motor 250 to measure a position of the reaction motor 250. For example, the position sensor 260 may be implemented as an angle sensor that measures a rotation angle of the reaction force motor 250. In this case, a position of the reaction motor 250 may be derived based on an angle value measured by the angle sensor. From this perspective, the angle sensor may be called a motor position sensor (MPS).

Meanwhile, although not shown in FIG. 2, the steering shafts 220 and 230 may include torque sensors to measure torque generated by rotation of the steering wheel 210. The torque sensor may be referred to as a torque angle sensor (TAS), torque only sensor (TOS), etc. The torque sensor may include a plurality of sensors, and may include, for example, a torque sensor over 225 (TSO) provided at the upper steering shaft 220 and a torque sensor under 235 (TSU) provided at the lower steering shaft 230. The TSO and TSU may be implemented as angle sensors and may be configured to measure a twist angle of the upper steering shaft 220 and a twist angle of the lower steering shaft 230, respectively.

The torque sensor and/or the steering control apparatus may calculate torque of the steering wheel 210 based on a difference between an angle value measured by the TSO and an angle value measured by the TSU. In addition, the steering control apparatus may derive a driving speed, a steering angle, etc. of the steering wheel 210 using the angle value measured by the TSO and the angle value measured by the TSU.

If the steering system includes a rigid body from the reaction motor to the TSU, there will be no or constant difference between the measured value of the MPS and the measured value of the TSU. However, there is always a difference between the measured value of the MPS and the measured value of the TSU due to motor power, an external load, a clearance of the mechanical part, etc. The difference between the measured value of the MPS and the measured value of TSU may be defined as SFA compliance. If the SFA compliance exceeds a threshold, the steering control apparatus may determine that the SFA mechanical part is out of order.

Figure 3:
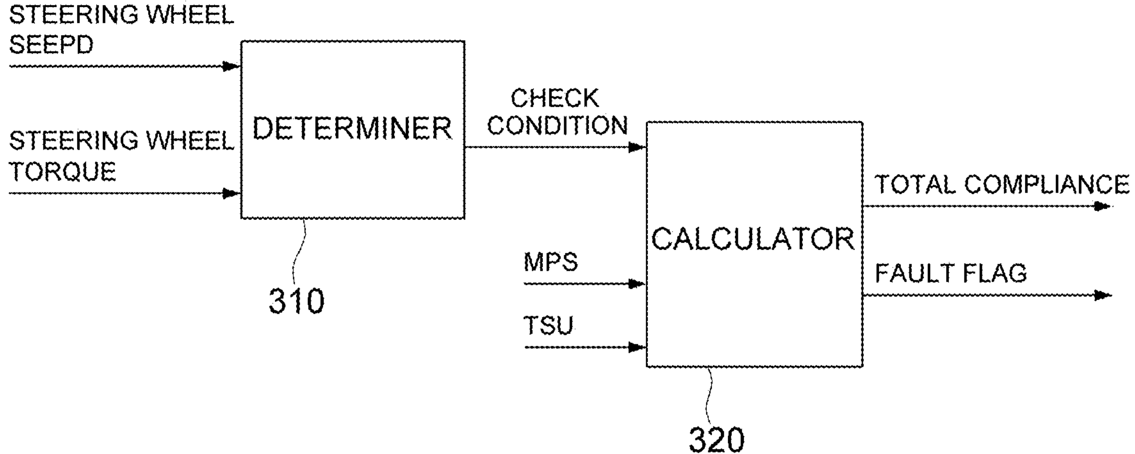
FIG. 3 is a diagram illustrating a steering control apparatus according to an embodiment of the present disclosure.

FIG. 3 is a diagram illustrating a steering control apparatus according to an embodiment of the present disclosure.

A steering control apparatus according to an embodiment of the present disclosure may include a communicator, a memory, and a controller.

The communicator may include a transmitter and a receiver and may be referred to as various terms, such as a communication interface and a transceiver. The communicator may be configured to communicate with other electronic control devices, sensors, etc. in the vehicle through CAN. For example, the receiver may receive measured values from sensors provided in the SFA mechanical part and/or the RWA mechanical part. In addition, the transmitter may transmit a control signal (or control command) generated by the controller to the SFA and/or RWA.

The memory may store information received through the communicator and provide the controller with information requested by the controller. The memory may be implemented with various types of volatile and/or non-volatile storage mediums, such as read only memory (ROM) and random access memory (RAM).

The controller may be implemented as an micro controller unit (MCU) or a semiconductor device that executes instructions stored in the memory. As shown in FIG. 3, the controller may include a determiner 310 and a calculator 320.

The determiner 310 may determine whether a current state of the vehicle meets the SFA compliance check conditions based on information received from sensors within the vehicle. The SFA compliance check conditions may be selected from among conditions in which the influence of disturbance is small when calculating SFA compliance and reliability of a value thereof is high.

For example, the compliance check conditions may include at least one of a check condition regarding torque of the steering wheel, a check condition regarding a driving speed of the steering wheel, and a check condition regarding a steering angle of the steering wheel.

As an example, the determiner 310 may determine whether the current state of the vehicle satisfies the SFA compliance check conditions based on the torque, driving speed, and steering angle of the steering wheel.

Specifically, the determiner 310 may periodically determine whether the torque of the steering wheel is within a reference range. Here, the reference range may be set to 10% of the maximum power (or maximum output), for example. If the current torque of the steering wheel does not exist within the reference range, the determiner 310 may determine that the current state of the vehicle does not satisfy the SFA compliance check conditions. In this case, the calculator 320 may not update SFA compliance. That is, the controller of the steering control apparatus may skip calculation of SFA compliance if the current state of the vehicle does not meet the SFA compliance check conditions.

If the current torque of the steering wheel is within the reference range, the determiner 310 may determine whether the torque of the steering wheel is increasing by comparing a first torque value calculated at a first time point with a second torque value calculated at a second time point. Here, the first time point may refer to a current time point, and the second time point may refer to a time point after the first time point. If the second torque value calculated at the second time point is greater than the first torque value calculated at the first time point, the determiner 310 may determine that the steering of the vehicle and force applied to the SFA mechanical part are in the same direction. If the second torque value calculated at the second time point is less than or equal to the first torque value calculated at the first time point, the determiner 310 may determine that the current state of the vehicle does not meet the SFA compliance check conditions.

Meanwhile, the determiner 310 may determine whether the driving speed of the steering wheel is lower than a threshold speed. If the driving speed of the steering wheel is equal to or greater than the threshold speed, SFA compliance may include disturbance caused by steering. Therefore, the steering control apparatus may perform the calculation of SFA compliance only when the driving speed of the steering wheel is low.

In addition, the determiner 310 may determine whether a current angle (steering angle) of the steering wheel is within a threshold range based on the angle and/or position of the steering wheel when the current torque of the steering wheel is 0. That is, when the current torque of the steering wheel is 0, the controller of the steering control apparatus may set the current angle of the steering wheel as a reference position for the threshold range. If the current angle of the steering wheel is within the threshold range, the determiner 310 may determine that the SFA compliance check conditions are satisfied.

If the SFA compliance check conditions are satisfied, the calculator 320 may update at least one of the first compliance and the second compliance based on the current torque value of the steering wheel. Here, the first compliance may refer to compliance when the vehicle is driven in the left direction, and the second compliance may refer to compliance when the vehicle is driven in the right direction.

As an example, the calculator 320 may calculate a difference value between the MPS and the TSU, and when the current torque value of the steering wheel is a positive number, the calculator 320 may derive or update the difference value as a first compliance value. If the current torque value of the steering wheel is a negative number, the calculator 320 may derive or update the difference value between the MPS and the TSU as a second compliance value. In addition, the calculator 320 may compare the sum (total compliance) of the first compliance and the second compliance with a threshold value and generate a signal (fault flag) representing whether a compliance defect is detected according to a comparison result.

Figure 4:
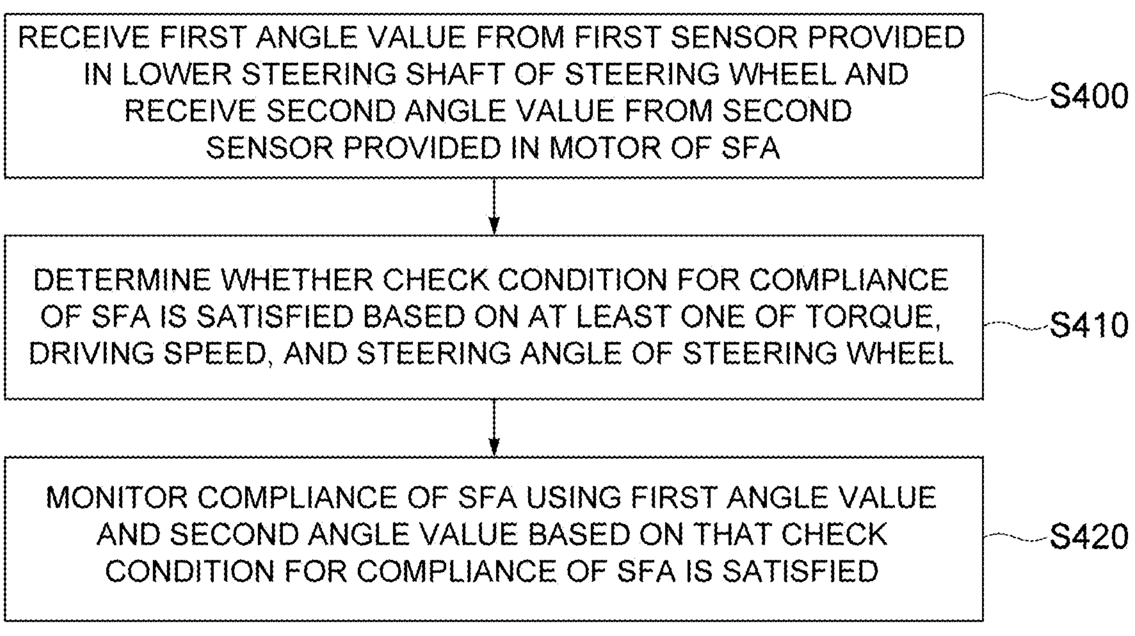
FIG. 4 is a diagram illustrating a method for a steering control apparatus to monitor SFA compliance according to an embodiment of the present disclosure.

FIG. 4 is a diagram illustrating a method for a steering control apparatus to monitor SFA compliance according to an embodiment of the present disclosure.

Referring to FIG. 4, the steering control apparatus according to an embodiment of the present disclosure may receive a first angle value from a first sensor provided in an upper portion of a steering shaft of a steering wheel in an SbW system and receive a second angle value from a second sensor provided in a motor of an SFA mechanical part (S400). Here, the first sensor may include a TSU, and the second sensor may include an MPS. In this case, the first angle value may represent an angle of a lower portion of the steering shaft or a torsion bar, and the second angle value may represent a rotation angle of the motor (a reaction force motor).

Meanwhile, the steering control apparatus may receive a third angle value from a TSO provided in the upper portion of the steering shaft of the steering wheel and calculate torque of the steering wheel based on a difference value between the third angle value and a first angle value received from the TSU provided in the lower portion of the steering shaft. In addition, the steering control apparatus may calculate a driving speed, a steering angle, etc. of the steering wheel using the third angle value measured by the TSO and the first angle value measured by the TSU.

The steering control apparatus may determine whether check conditions for compliance of the SFA are satisfied based on at least one of the torque, driving speed, and steering angle of the steering wheel (S410). If the check conditions for compliance of the SFA are satisfied, the steering control apparatus may monitor compliance of the SFA using the first angle value and the second angle value (S420).

For example, when the check conditions for compliance of the SFA are satisfied and a torque value of the steering wheel is a positive value, the steering control apparatus may derive a difference between the first angle value and the second angle value as a first compliance. However, when the torque value of the steering wheel is a negative number, the steering control apparatus may derive the difference between the first angle value and the second angle value as a second compliance. In addition, the steering control apparatus may compare the sum (SFA compliance) of the first compliance and the second compliance with a threshold value. If the SFA compliance is greater than the threshold, the steering control apparatus may output a signal representing that an SFA compliance defect is detected. However, if the SFA compliance is equal to or less than the threshold value, the steering control apparatus may output a signal representing that the SFA compliance is normal.

Figure 5:
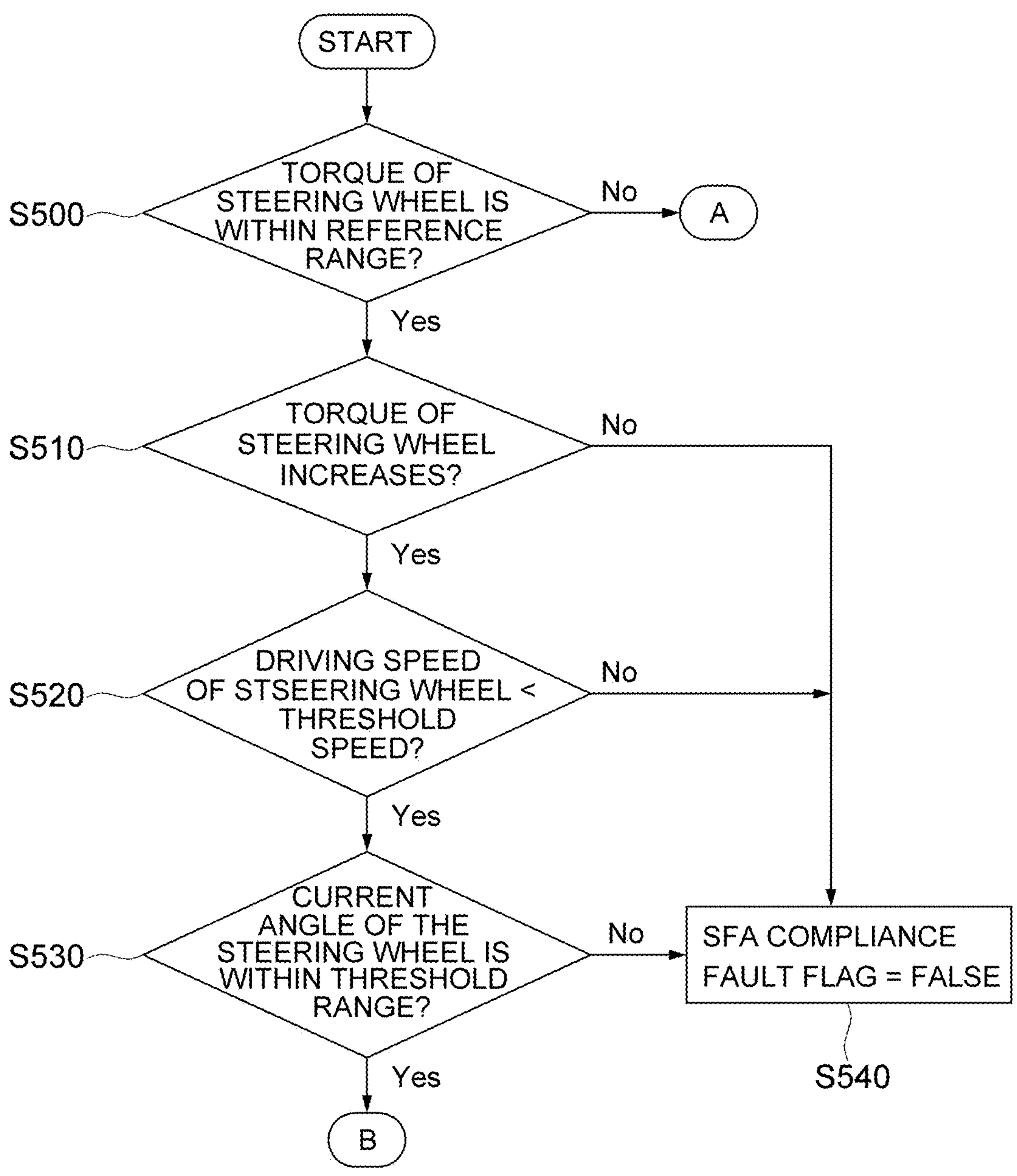
FIG. 5 is a diagram illustrating a process in which a steering control apparatus determines SFA compliance check conditions according to an embodiment of the present disclosure.

FIG. 5 is a diagram illustrating a process in which a steering control apparatus determines SFA compliance check conditions according to an embodiment of the present disclosure.

Hereinafter, the process in which the steering control apparatus according to an embodiment of the present disclosure determines whether a current state of a vehicle satisfies the check conditions for SFA compliance is described in more detail with reference to FIG. 5.

Referring to FIG. 5, as an example, the steering control apparatus may determine whether a torque value (a first torque value) of the steering wheel calculated at a first time point is within a reference range (S500). If the first torque value is within the reference range, the steering control apparatus compares a steering wheel torque value (a second torque value) calculated at a second time point with the first torque value to determine whether the torque of the steering wheel is increasing (S510).

If the second torque value is greater than the first torque value, the steering control apparatus may determine that the check condition for the torque of the steering wheel are satisfied and determine whether a current driving speed of the steering wheel is lower than a threshold speed (S520).

If the speed of the steering wheel is lower than the threshold speed, the steering control apparatus may determine that the check condition for the driving speed of the steering wheel are satisfied and determine whether the current angle of the steering wheel is within the threshold range (S530). Here, the threshold range may be set based on the angle of the steering wheel when the torque of the steering wheel is 0.

If the steering wheel angle is within the threshold range, the steering control apparatus may determine that the check condition for the angle of the steering wheel are satisfied.

For example, when the torque of the steering wheel increases within a reference range, while the driving speed of the steering wheel is low and the angle of the steering wheel is within the threshold range (for example, within an error range of 5 degrees from the reference angle), the steering control apparatus may determine that the current state of the vehicle meets the conditions for confirming SFA compliance.

In FIG. 5, as an example, a case in which the steering control apparatus determines whether the check condition for the torque of the steering wheel are satisfied and then sequentially determines whether the check condition for the driving speed of the steering wheel and the angle of the steering wheel are satisfied is illustrated. However, there is no limit to the order of determining whether respective check conditions are satisfied, and if necessary, whether the check condition for the driving speed of the steering wheel are satisfied may be first determined or whether the check condition for the angle of the steering wheel are satisfied may be first determined before whether the check condition for the torque of the steering wheel are satisfied is determined.

If any of the aforementioned check conditions are not satisfied, the steering control apparatus may determine that the current state of the vehicle does not satisfy the SFA compliance check conditions. In this case, a value of a signal (SFA compliance fault flag) representing whether SFA compliance is defective may have a value of 0 (false), and the calculation of SFA compliance may be omitted. If the value of SFA compliance fault flag is 1 (true), the value 1 may represent that an SFA compliance fault is detected.

Figure 6:
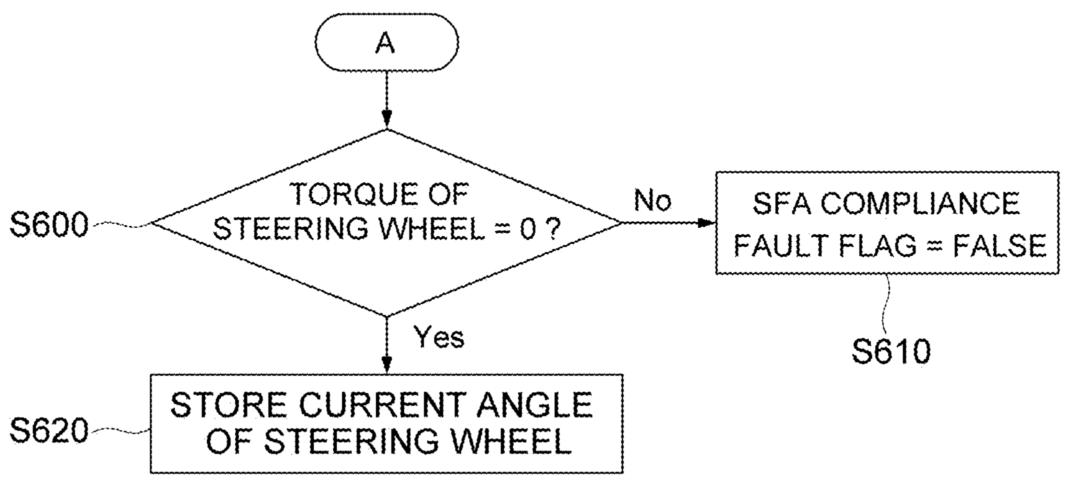
FIG. 6 is a diagram illustrating a process in which a steering control apparatus according to an embodiment of the present disclosure sets a threshold range for a steering angle of a steering wheel.

FIG. 6 is a diagram illustrating a process in which a steering control apparatus according to an embodiment of the present disclosure sets a threshold range for a steering angle of a steering wheel.

Referring to FIG. 6, in determining whether the SFA compliance check conditions are satisfied, if a current torque value of the steering wheel is not within the reference range, the steering control apparatus according to an embodiment of the present disclosure may determine whether the current torque value of the steering wheel is 0 (S600). If the current torque value of the steering wheel is not 0, the steering control apparatus may set the value of the SFA compliance fault flag to 0 (false) (S610). That is, if the current torque value of the steering wheel is not within the reference range and the current torque value of the steering wheel is not 0, the steering control apparatus may not monitor SFA compliance.

However, if the current torque value of the steering wheel is 0, the steering control apparatus may store the current angle of the steering wheel (S620) and set the current angle as a reference position to be used when determining whether the angle of the steering wheel is within the threshold range.

Figure 7:
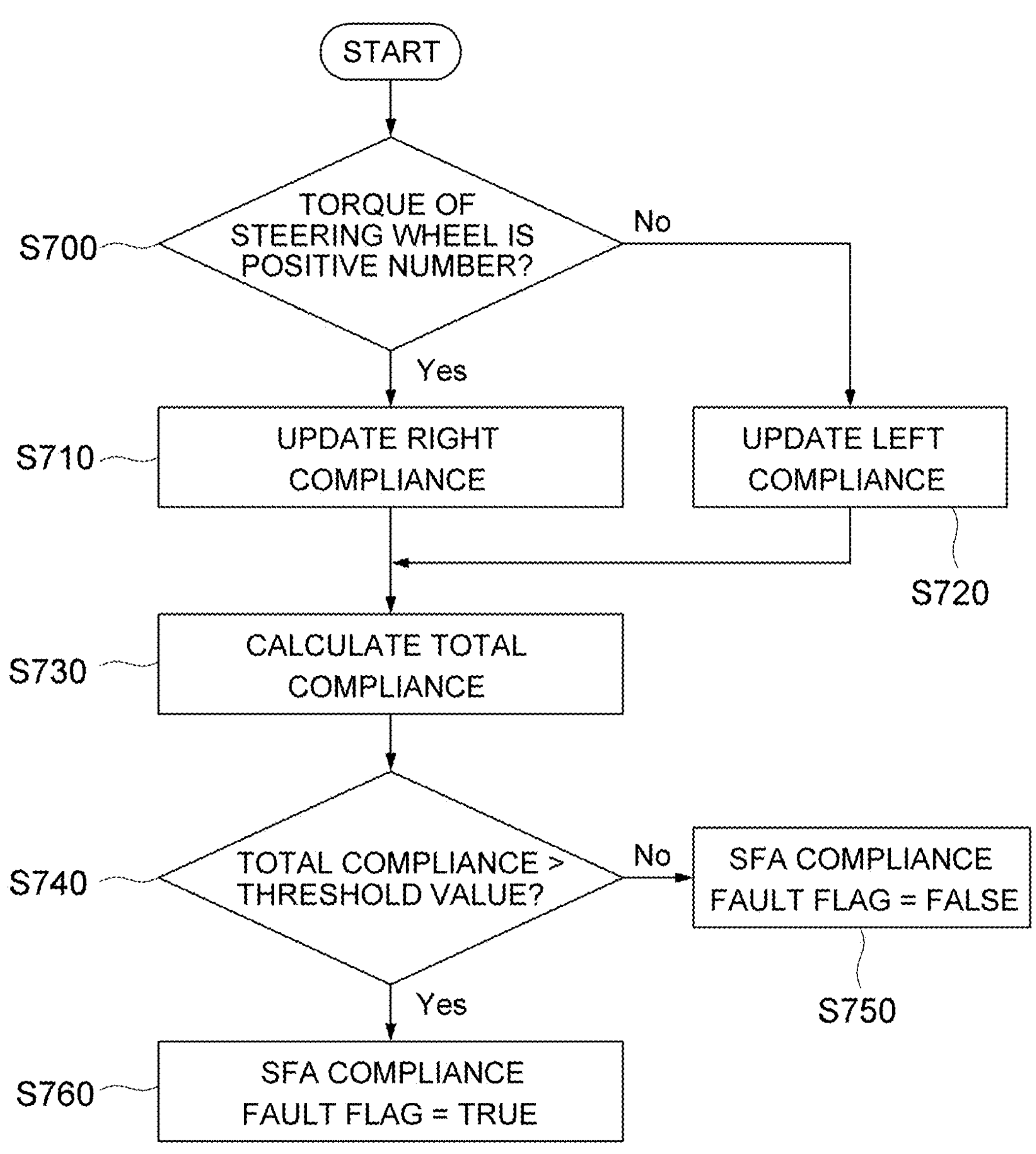
FIG. 7 is a diagram illustrating a process in which a steering control apparatus determines whether SFA compliance is defective according to an embodiment of the present disclosure.

FIG. 7 is a diagram illustrating a process in which a steering control apparatus according to an embodiment of the present disclosure determines whether SFA compliance is defective.

When the SFA compliance check conditions described above with reference to FIG. 5 are satisfied, the steering control apparatus according to an embodiment of the present disclosure may perform an SFA compliance calculation process (or an SFA compliance update process) shown in FIG. 7

Referring to FIG. 7, for example, the steering control apparatus may determine whether the current torque value of the steering wheel is a positive number (S700). When the torque value of the steering wheel is a positive number, the steering control apparatus may update a difference value between the measured value of the MPS and the measured value of the TSU as right compliance when steering in the right direction (S710). If the torque value of the steering wheel is a negative number, the steering control apparatus may update the difference value between the measured value of the MPS and the measured value of the TSU as left compliance when steering in the left direction (S720).

The steering control apparatus may calculate or derive the SFA compliance (total compliance) by adding the two compliances (right compliance and left compliance) (S730) and compare the SFA compliance with a threshold value (S740).

If the SFA compliance is equal to or less than the threshold value, the steering control apparatus may output a signal (SFA compliance fault flag=false) representing that a compliance defect is not detected in the SFA mechanical part (S750). However, if the SFA compliance value is greater than the threshold value, the steering control apparatus may output a signal (SFA compliance fault flag=true) representing that a compliance defect is detected (S760).

Therefore, since the steering control apparatus according to an embodiment of the present disclosure may monitor SFA compliance at all times, the performance of the SFA mechanical part may be maintained at a constant level, and even if a defect occurs, the defect may be detected at an early stage.

Meanwhile, the respective operations included in the SFA compliance monitoring method, performed by the steering control apparatus according to the above-described embodiment, may be implemented as a computer program including instructions for causing a processor to perform the operations.

In addition, each operation included in the SFA compliance monitoring method, performed by the steering control apparatus according to the above-described embodiment, may be implemented in a computer readable recording medium having a computer program storing instructions thereon, the instructions for causing a processor to perform the operations.

Combinations of individual steps of the appended flow diagrams of the present disclosure may be performed by computer program instructions. Since these computer program instructions may be provided to a processor of a general-purpose computer, a special-purpose computer, or other programmable data processing apparatus, the instructions executed through the processor of the computer or other programmable data processing apparatus generate means for implementing the functions specified in the individual steps of the flow diagrams. Since these computer program instructions may also be stored in a computer-usable or computer-readable memory that may be directed to a computer or other programmable data processing apparatus to implement a function in a particular manner, the instructions stored in the computer-usable or computer-readable memory may produce a manufacturing item including instructions that execute the functions specified in the individual steps of the flow diagrams. Since the computer program instructions may also be loaded onto a computer or other programmable data processing apparatus, by performing a series of operational steps on the computer or other programmable data processing apparatus to generate a process executed by the computer, the instructions operating the computer or other programmable data processing apparatus may also provide steps for executing the functions specified in the respective steps of the flow diagrams.

Also, each step may represent part of a module, segment, or code including one or more executable instructions for executing a specific logical function(s). Also, it is also possible that in some alternative embodiments, the specified functions are executed out of specified order. For example, it is possible that two steps shown one after another may be performed simultaneously, or the steps may be performed in reverse order depending on the corresponding functions.

The above description is merely exemplary description of the technical scope of the present disclosure, and it should be understood by those skilled in the art that various changes and modifications may be made without departing from original characteristics of the present disclosure. Therefore, the embodiments disclosed in the present disclosure are intended to explain, not to limit, the technical scope of the present disclosure, and the technical scope of the present disclosure is not limited by the embodiments. The protection scope of the present disclosure should be interpreted based on the following claims, and it should be appreciated that all technical scopes included within a range equivalent thereto are included in the protection scope of the present disclosure.

DETAILED DESCRIPTION OF MAIN ELEMENTS

110: SFA
115: STEERING WHEEL
120: RWA
125: RACK
130: STEERING CONTROL APPARATUS
210: STEERING WHEEL
220: UPPER STEERING SHAFT
230: LOWER STEERING SHAFT
240: TORSION BAR
250: REACTION MOTOR
260: POSITION SENSOR
310: DETERMINER
320: CALCULATOR

What is claimed is:

1. A steering control apparatus of a steer-by-wire system including a steer wheel feedback actuator and a road wheel actuator, the steering control apparatus comprising:

a controller configured to receive a first angle value from a first sensor provided at a lower steering shaft, mechanically connected to a steering wheel through an upper steering shaft, and receive a second angle value from a second sensor provided at a motor of the steer wheel feedback actuator; and monitor compliance of the steer wheel feedback actuator using the first angle value and the second angle value based on determination of whether at least one of torque, a driving speed, and a steering angle of the steering wheel satisfies at least one preset condition for checking the compliance of the steer wheel feedback actuator.

2. The steering control apparatus of claim 1, wherein the controller is configured to:

calculate the torque of the steering wheel based on a difference between a third angle value received from a third sensor provided at the upper steering shaft connected to the steering wheel and the first angle value received from the first sensor provided at the lower steering shaft, and determine whether the torque of the steering wheel increases within a reference range.

3. The steering control apparatus of claim 2, wherein the controller is configured to determine that the torque of the steering wheel satisfies the at least one preset condition for checking the compliance of the steer wheel feedback actuator based on determination that the torque of the steering wheel increases within the reference range.

4. The steering control apparatus of claim 1, wherein the controller is configured to determine whether the driving speed of the steering wheel is lower than a threshold speed, and determine that the driving speed of the steering wheel satisfies the at least one preset condition for checking the compliance of the steer wheel feedback actuator based on determination that the driving speed of the steering wheel is lower than the threshold speed.

5. The steering control apparatus of claim 1, wherein the controller is configured to determine whether the steering angle of the steering wheel is within a threshold range, and determine that the steering angle of the steering wheel satisfies the at least one preset condition for checking the compliance of the steer wheel feedback actuator based on determination that the steering angle of the steering wheel is within the threshold range.

6. The steering control apparatus of claim 5, wherein the threshold range is set based on the steering angle of the steering wheel when the torque of the steering wheel is 0.

7. The steering control apparatus of claim 1, wherein the controller is configured to update a first compliance based on a difference between the first angle value and the second angle value when the torque of the steering wheel is a positive number and the at least one preset condition for checking the compliance of the steer wheel feedback actuator is satisfied, and update a second compliance based on the difference between the first angle value and the second angle value when the torque of the steering wheel is a negative number and the at least one preset condition for checking the compliance of the steer wheel feedback actuator is satisfied.

8. The steering control apparatus of claim 7, wherein the controller is configured to generate a signal representing that a failure of the compliance of the steer wheel feedback actuator is detected when a sum of the first compliance and the second compliance is greater than a threshold value.

9. A method of monitoring a steer-by-wire system including a steer wheel feedback actuator and a road wheel actuator, the method comprising:

receiving a first angle value from a first sensor provided at a lower steering shaft, mechanically connected to a steering wheel through an upper steering shaft, and receiving a second angle value from a second sensor provided at a motor of the steer wheel feedback actuator;

determining whether a preset condition for checking compliance of the steer wheel feedback actuator is satisfied based on at least one of torque, a driving speed, and a steering angle of the steering wheel; and monitoring the compliance of the steer wheel feedback actuator using the first angle value and the second angle value based on determination that the preset condition for checking the compliance of the steer wheel feedback actuator is satisfied.

10. The method of claim 9, wherein the determining of whether the preset condition for checking the compliance of the steer wheel feedback actuator is satisfied includes calculating the torque of the steering wheel based on a difference between a third angle value received from a third sensor provided at the upper steering shaft and the first angle value received from the first sensor provided at the lower steering shaft and, determining whether the torque of the steering wheel increases within a reference range.

11. The method of claim 10, further comprising, after the determining of whether the preset condition for checking the compliance of the steer wheel feedback actuator is satisfied, determining that the torque of the steering wheel satisfies the preset condition for checking the compliance of the steer wheel feedback actuator based on determination that the torque of the steering wheel increases within the reference range.

12. The method of claim 9, wherein the determining of whether the preset condition for checking the compliance of the steer wheel feedback actuator is satisfied includes:

determining whether the driving speed of the steering wheel is lower than a threshold speed and determining that the driving speed of the steering wheel satisfies the preset condition for checking the compliance of the steer wheel feedback actuator based on determination that the driving speed of the steering wheel is lower than the threshold speed.

13. The method of claim 9, wherein the determining of whether the preset condition for checking the compliance of the steer wheel feedback actuator is satisfied includes:

determining whether the steering angle of the steering wheel is within a threshold range; and determining that the steering angle of the steering wheel satisfies the preset condition for checking the compliance of the steer wheel feedback actuator based on determination that the steering angle of the steering wheel is within the threshold range.

14. The method of claim 13, wherein the threshold range is set based on the steering angle of the steering wheel when the torque of the steering wheel is 0.

15. The method of claim 9, wherein the monitoring includes updating a first compliance based on a difference between the first angle value and the second angle value when the torque of the steering wheel is a positive number and the preset condition for checking the compliance of the steer wheel feedback actuator is satisfied, and updating a second compliance based on the difference between the first angle value and the second angle value when the torque of the steering wheel is a negative number and the preset condition for checking the compliance of the steer wheel feedback actuator is satisfied.

16. The method of claim 15, further comprising generating a signal representing that a failure of the compliance of the steer wheel feedback actuator is detected when a sum of the first compliance and the second compliance is greater than a threshold value.

17. A computer-readable medium configured to store at least one instruction, that when executed by a processor, causes the processer to perform operations comprising:

determining whether a preset condition for checking compliance of a steer wheel feedback actuator of a steer-by-wire system is satisfied based on at least one of torque, a driving speed, and a steering angle of a steering wheel provided in the steer-by-wire system; and monitoring the compliance of the steer wheel feedback actuator using a first angle value received from a first sensor provided at a lower steering shaft, mechanically connected to the steering wheel through an upper steering shaft, and a second angle value received from a second sensor provided at a motor of the steer wheel feedback actuator based on determination that the preset condition for checking the compliance of the steer wheel feedback actuator is satisfied.

18. The computer-readable medium of claim 17, wherein the determining of whether the preset condition for checking the compliance of the steer wheel feedback actuator is satisfied includes:

calculating the torque of the steering wheel based on a difference between a third angle value received from a third sensor provided at the upper steering shaft and the first angle value received from the first sensor provided at the lower steering shaft and determining whether the torque of the steering wheel increases within a reference range; and determining that the torque of the steering wheel satisfies the preset condition for checking the compliance of the steer wheel feedback actuator based on determination that the torque of the steering wheel increases within the reference range.

19. The computer-readable medium of claim 17, wherein the determining of whether the preset condition for checking the compliance of the steer wheel feedback actuator is satisfied includes:

determining whether the driving speed of the steering wheel is lower than a threshold speed; and determining that the driving speed of the steering wheel satisfies the preset condition for checking the compliance of the steer wheel feedback actuator based on determination that the driving speed of the steering wheel is lower than the threshold speed.

20. The computer-readable medium of claim 17, wherein the determining of whether the preset condition for checking the compliance of the steer wheel feedback actuator is satisfied includes:

determining whether the steering angle of the steering wheel is within a threshold range; and determining that the steering angle of the steering wheel satisfies the preset condition for checking the compliance of the steer wheel feedback actuator based on determination that the steering angle of the steering wheel is within the threshold range.

* * * * *